United States Patent
Niina et al.

(10) Patent No.: US 10,838,938 B2
(45) Date of Patent: Nov. 17, 2020

(54) PROCESS MONITORER, PROCESS MONITERING SYSTEM, PROCESS MONITERING METHOD, PROCESS MONITERING PROGRAM, AND RECORDING MEDIAM

(71) Applicant: Yokogawa Electric Corporation, Tokyo (JP)

(72) Inventors: Nobuhiro Niina, Tokyo (JP); Eiji Taya, Tokyo (JP); Osamu Aoki, Tokyo (JP)

(73) Assignee: Yokogawa Electric Corporation, Musashino (JP)

(*) Notice: Subject to any disclaimer, the term of this patent is extended or adjusted under 35 U.S.C. 154(b) by 719 days.

(21) Appl. No.: 15/451,634

(22) Filed: Mar. 7, 2017

(65) Prior Publication Data

US 2017/0262480 A1    Sep. 14, 2017

(30) Foreign Application Priority Data

Mar. 10, 2016  (JP) .................................. 2016-046867

(51) Int. Cl.
*G06F 16/00* (2019.01)
*G06F 16/22* (2019.01)
(Continued)

(52) U.S. Cl.
CPC ......... *G06F 16/2228* (2019.01); *G06Q 10/00* (2013.01); *G06Q 10/06* (2013.01);
(Continued)

(58) Field of Classification Search
CPC ............. G05B 23/0235; G06F 16/2228; G06F 9/4881; G06F 2209/485; G06Q 10/06
See application file for complete search history.

(56) References Cited

U.S. PATENT DOCUMENTS 5,970,243 A * 10/1999 Klein ..................... G06F 8/656
717/113
7,484,214 B2 * 1/2009 Tsunedomi .......... G05B 19/042
710/266
(Continued)

FOREIGN PATENT DOCUMENTS

CN           202872274 U      4/2013
CN           203198297 U      9/2013
(Continued)

*Primary Examiner* — Merilyn P Nguyen
(74) *Attorney, Agent, or Firm* — Sughrue Mion, PLLC

(57) ABSTRACT

The present invention provides a process monitorer, a process monitoring system, a process monitoring method, a process monitoring program, and a recording medium for monitoring processes in real time. The process monitorer including: a process information acquirer for acquiring process information indicating a state of a process provided from an industrial device; an indexed information generator for generating the indexed information indexed by a predetermined index based on the process information; a threshold acquirer for acquiring a threshold of the indexed information; a result of the determination generator for generating the result of the determination of the indexed information based on the threshold; a result of the determination notifier for notifying the result of the determination; an indexed information recorder for recording the indexed information; and a chart generator for generating a chart based on the indexed information.

20 Claims, 5 Drawing Sheets

(51) Int. Cl.
  *G06Q 10/06* (2012.01)
  *G06Q 10/00* (2012.01)
  *H04L 29/08* (2006.01)

(52) U.S. Cl.
  CPC .............. *H04L 67/12* (2013.01); *H04L 67/28* (2013.01); *Y02P 90/86* (2015.11)

(56) References Cited

U.S. PATENT DOCUMENTS

| | | | |
|---|---|---|---|
| 9,874,522 B2* | 1/2018 | Alon ..................... | G01J 3/4412 |
| 2006/0195215 A1* | 8/2006 | Suzuki ............. | G05B 19/41875 |
| | | | 700/109 |
| 2011/0238372 A1* | 9/2011 | Akimoto .............. | G05B 23/024 |
| | | | 702/182 |
| 2013/0073061 A1* | 3/2013 | Mu ...................... | G05B 13/041 |
| | | | 700/29 |
| 2015/0212506 A1* | 7/2015 | Hasegawa ........... | G06F 19/3418 |
| | | | 700/51 |
| 2015/0286841 A1* | 10/2015 | Takenouchi ........ | G06F 21/6254 |
| | | | 726/26 |
| 2016/0034314 A1* | 2/2016 | Xu ........................ | G06F 9/4887 |
| | | | 718/103 |
| 2016/0079756 A1* | 3/2016 | Ikeyama ................. | H02J 3/381 |
| | | | 700/287 |
| 2016/0132538 A1* | 5/2016 | Bliss ...................... | G05B 21/02 |
| | | | 707/741 |
| 2017/0286971 A1* | 10/2017 | Husted Andersen ........................ |  |
| | | | G06F 16/2379 |
| 2018/0004193 A1* | 1/2018 | Gugaliya ............. | G05B 19/056 |

FOREIGN PATENT DOCUMENTS

| | | |
|---|---|---|
| CN | 103454146 A | 12/2013 |
| CN | 203337058 U | 12/2013 |
| CN | 103530976 A | 1/2014 |
| JP | 10254536 A | 9/1998 |
| JP | 2002-157279 A | 5/2002 |
| JP | 2008152312 A | 7/2008 |

* cited by examiner

| INDEX | INDEX TYPE | THRESHOLD VALUE TYPE | SELECTION CHART |
|---|---|---|---|
| INDEX 1 | AMOUNT OF ELECTRIC ENERGY | MAXIMUM VALUE | LINE GRAPH |
| INDEX 2 | TEMPERATURE A | MAXIMUM VALUE | LINE GRAPH |
| INDEX 3 | TEMPERATURE B | MINIMUM VALUE | LINE GRAPH |
| INDEX 4 | PRODUCTION AMOUNT | CHANGING RATE | BAR GRAPH |
| INDEX 5 | PROCESS TIME | STANDARD DEVIATION | TABLE |
| INDEX 6 | TEMPERATURE A/B CORRELATION | CORRELATION COEFFICIENT | DISTRIBUTION CHART |
| INDEX 7 | CLUSTERING | CLUSTER FLUCTUATION | TABLE |
| ... | ... | ... | ... |

1001 — INDEX
1002 — INDEX TYPE
1003 — THRESHOLD VALUE TYPE
1004 — SELECTION CHART

| PROCESS | INDEX 1 AMOUNT OF ELECTRIC ENERGY (W) | INDEX 2 TEMPERATURE A (DEGREE) | INDEX 3 TEMPERATURE B (DEGREE) | INDEX 4 PRODUCT AMOUNT (%) | INDEX 5 PROCESS TIME (MINUTE) |
|---|---|---|---|---|---|
| PROCESS A | 10 | 50 | 40 | 5 | 2 |
| PROCESS B | 6 | 60 | 50 | 3 | 1 |
| PROCESS C | 8 | 40 | 30 | 2 | 1 |
| PROCESS D | 15 | 30 | 20 | 2 | 1 |
| ... | ... | ... | ... | ... | ... |

1011 — PROCESS
1012 — INDEX 1
1013 — INDEX 2
1014 — INDEX 3
1015 — INDEX 4
1016 — INDEX 5

PROCESS MONITORER, PROCESS MONITERING SYSTEM, PROCESS MONITERING METHOD, PROCESS MONITERING PROGRAM, AND RECORDING MEDIAM

BACKGROUND OF THE INVENTION

Field of the Invention

Embodiments of the present invention relates to a process monitorer, a process monitoring system, a process monitoring method, a process monitoring program, and a recording medium.

Priority is claimed on Japanese Patent Application No. 2016-046867, filed on Mar. 10, 2016, the contents of which are incorporated herein by reference.

Description of Related Art

Field devices and distributed control systems (DCS) have been conventionally constructed in plants. The plants include industrial plants such as chemical plants, plants that manage and control wells such as gas fields and oil wells and their surroundings, plants that manage and control a power generation such as a hydropower, a thermal power and a nuclear power, and plants that manage and control an environmental power generation using sunlight and wind power and so on, plants that manage and control a water supply and sewage system and dams and the like, and factories and the like. Hereinafter, they are referred to as "plant". The field device includes on-site devices such as a measurer or an operator. The distributed control system is constructed by connecting the field device and a controller for controlling the field device via a communicator, and realizes highly advanced automatic operation.

In the plant implementing such as a high-tech automatic operation that record various plant information such a measurement result of the fielder, various plant information such as a result of a measurement, an operation condition of the plant, maintenance information of the device, or product information is recorded in a data collector, a device analyzing the recorded plant information is used. Japanese Patent Laid-Open No. 2002-157279 is cited as Patent Document 1 that discloses such the technique described above.

In recent years, a technique utilizing Internet technology is being applied which is called the IIoT (Industrial Internet of Things) in all industries. The IIoT targets to improve productivity and the like by connecting not only the devices used for the plants but also the manufacturing industry which involves operations such as processing, shaping, and assembly, and devices in various industrial fields such as mining, agriculture, logistics, medical care, and nursing care, etc. (hereinafter referred to as "Industrial device") to the network.

However, since the data collector for collecting information used in a process type manufacturing industries such as the plants continuously collects the information, the amount of the information becomes large. Therefore, it is necessary to construct a large-scale database (DB). The large-scale DB may, for example, change the process of the plant and change the DB function, or the like. In that case, it may be required an expert knowledge for remodeling the DB, and it may cost the high maintenance cost. Further, since the amount of the collected information is small and the processes are frequently changed in the discrete-type manufacturing industries in which a cell-based assembly line and the like are constructed, there was a case that the data collector was not installed because of rising maintenance cost of the DB.

In the process-type manufacturing industry, those who are abundant in experience and expert knowledge (analytical expert) analyze the information collected by the data collector to identify the cause of the defect such as occurrence of a defective product. In order to analyze the information, the analytical expert selects and collects the information to be an analyzation target among a large quantity of consecutive set of information stored in a database, to analyze the collected information by using various analysis methods, to select appropriate graphs etc., to draw analysis results into charts and to determine the cause of the defects based on the graphs and the charts etc. Thus, it takes a long time to identify the cause of the defect after the occurrence of the defect, and there were cases in which it was not possible to take measures against the defects in real time.

Further, in such as the discrete-type manufacturing industry, since the cause of the defect is often operation defect of the device itself and a mistake by the operator, etc., there were cases in which signs of the defect could be discovered even without analyzing by the analytical expert by collecting the predetermined measurement data and the like.

The present invention provides a process monitorer, a process monitoring system, a process monitoring method, a process monitoring program, and a recording medium for monitoring processes in real time.

SUMMARY

In one embodiment, a process monitorer includes, but is not limited to, a process information acquirer, an indexed information generator, a threshold acquirer, a determination result generator, and a determination result notifier. The process information acquirer configured to acquire process information indicating a state of a process provided from an industrial device; the indexed information generator configured to generate indexed information indexed by a predetermined index based on the process information; the threshold acquirer configured to acquire a threshold value of the indexed information; the determination result generator configured to generate a result of a determination of the indexed information based on the threshold value; and the determination result notifier configured to notify the result of the determination.

In another embodiment of the process monitorer, the process information acquirer acquires the process information via a relay for relaying the process information.

In another embodiment of the process monitorer, the process information acquirer acquires the process information received from an operator installed on the process via the relay.

In another embodiment of the process monitorer, the process monitorer further includes: the indexed information recorder for segmenting and recording the indexed information based on the result of the determination; and the chart generator for generating the chart based on the indexed information.

In another embodiment of the process monitorer, the indexed information recorder segments and records the indexed information based on the result of the determination, and the chart generator generates the chart based on the indexed information.

In another embodiment of the process monitorer, the chart generator generates the chart based on the pre-designated predetermined index.

In another embodiment, a device maintenance method is a method to be performed by a process monitorer. The device maintenance method includes, but is not limited to, the following processes: acquiring process information indicating a state of a process provided from an industrial device; generating indexed information indexed by a predetermined index based on the process information; acquiring a threshold value of the indexed information; generating a result of a determination of the indexed information based on the threshold value; notifying the result of the determination; recording the indexed information; and generating a chart based on the indexed information.

In another embodiment, a device maintenance program is a program to be performed by a process monitorer. The device maintenance program includes, but is not limited to, the following processes: acquiring process information indicating a state of a process provided from an industrial device; generating indexed information indexed by a predetermined index based on the process information; acquiring a threshold value of the indexed information; generating a result of a determination of the indexed information based on the threshold value; notifying the result of the determination; recording the indexed information; and generating a chart based on the indexed information.

In another embodiment, a non-transitory computer readable storage medium is a medium to be performed by a process monitorer. The non-transitory computer readable storage medium includes, but is not limited to, the following processes: acquiring process information indicating a state of a process provided from an industrial device; generating indexed information indexed by a predetermined index based on the process information; acquiring a threshold value of the indexed information; generating a result of a determination of the indexed information based on the threshold value; notifying the result of the determination; recording the indexed information; and generating a chart based on the indexed information.

The present invention provides a process monitorer, a process monitoring system, a process monitoring method, a process monitoring program, and a recording medium for monitoring processes in real time.

BRIEF DESCRIPTION OF THE DRAWINGS

FIG. 4 is a diagram showing an example of a setting of indices and charts generated by the process monitorer according to the embodiment of the present invention.

FIG. 5 is a diagram showing an example of a threshold value of indexed information to be determined by a process monitorer according to the embodiment of the present invention.

DETAILED DESCRIPTION OF THE EMBODIMENTS

The process monitorer, the process monitoring system, the process monitoring method, the process monitoring program, and the recording medium according to an embodiment of the present invention will be described in detail below with reference to the drawings.

Figure 1:
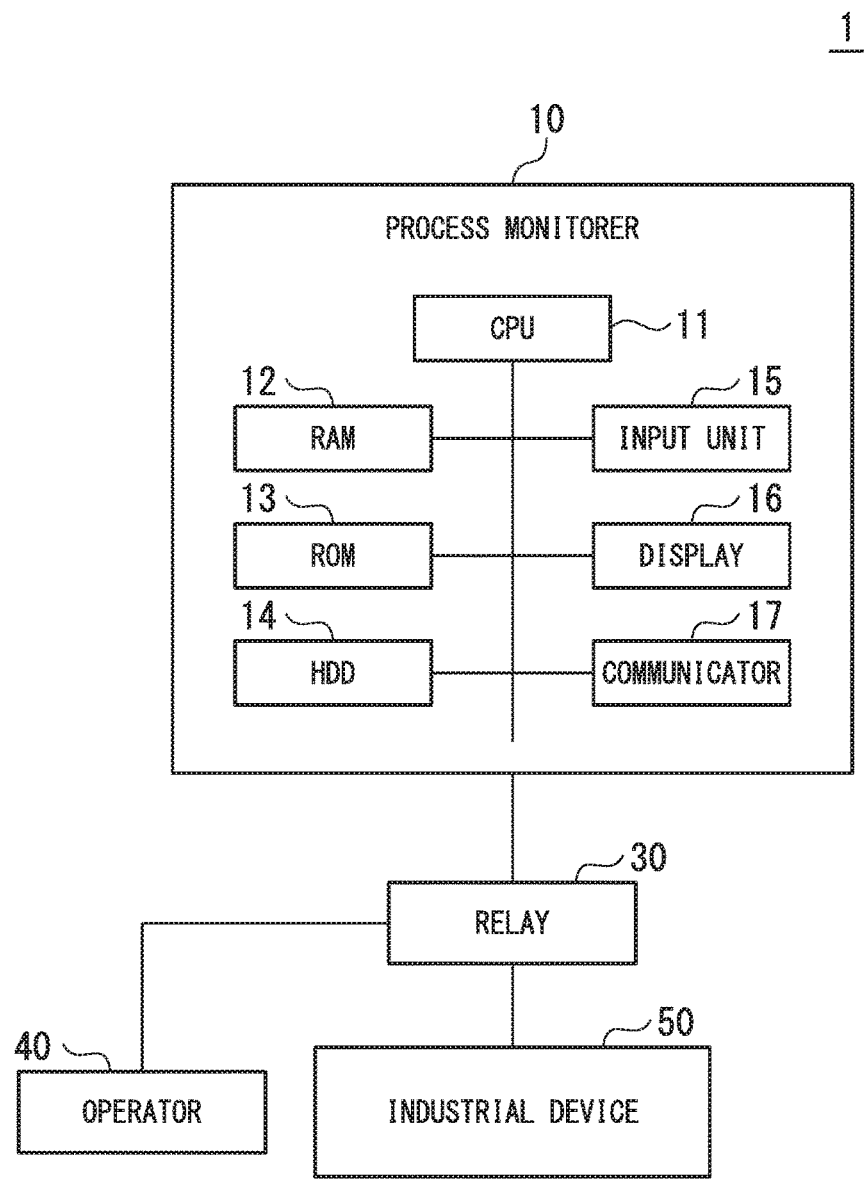
FIG. 1 is a block diagram showing an example of a hardware configuration of a process monitoring system according to an embodiment of the present invention.

A hardware configuration of the process monitoring system will be described with reference to FIG. 1. FIG. 1 is a block diagram showing the example of the hardware configuration of the process monitoring system according to the embodiment of the present invention.

In FIG. 1, the process monitoring system 1 may include a process monitorer 10, a relay 30, an operator 40, and an industrial device 50. The process monitorer 10 is connected to the industrial device 50 or the operator 40 via the relay 30.

The process monitorer 10 may include a CPU (Central Processing Unit) 11, a RAM (Random Access Memory) 12, a ROM (Read Only Memory) 13, a HDD (Hard Disk Drive) 14, an input unit 15, a display 16, and a communicator 17.

The process monitorer 10 may include, for example, a general-purpose computer or a computer for process monitoring such as a server, a desktop PC, a notebook PC, a tablet PC, a PDA, or a smart phone.

The CPU 11 may execute a program (process monitoring program) for monitoring the processes stored in the RAM 12, the ROM 13, or the HDD 14, and controls the process monitorer 10. The process monitoring program may be acquired from, for example, the recording medium in which the process monitoring program is recorded or a server providing the process monitoring program via a network, installed in the HDD 14 or the like, and stored in the RAM 12 so as to be readable from the CPU 11.

The input unit 15 may have a function of inputting data to the process monitorer 10. The input unit 15 may include, for example, a keyboard for inputting the data by an input operation of a user, which may include a worker, an operator, a monitor, a supervisor, a manager, etc., and a pointing device such as a mouse, a scanner for reading an image data, or an interface which is referred to as I/F for reading the data recorded on the recording medium, and the like. The display 16 may have a function of displaying the data and other information. The display 16 may include, for example, a display, and a lamp, or the like. It should be noted that the input unit 15 and the display 16 may be implemented by using a device that performs the inputting operation and the displaying such as a touch panel.

The communicator 17 may control communication with the relay 30 via a wired communication or a wireless communication. The communicator 17 may include, for example, a network adapter for the wired communication or the wireless communication. The communicator 17 may communicate with the industrial device 50 via the relay 30. The communicator 17 may control the communication with the relay 30 which uses a communication protocol dedicated for an industrial instrument such as an ISA 100 which is a wireless communication standard of ISA (International Society of Automation), a HART (Highway Addressable Remote Transducer) (registered trademark), a BRAIN (registered trademark), a FOUNDATION Fieldbus, a PROFIBUS. Further, the communicator 17 may control general-purpose communication protocols such as a wireless LAN communication, a wired LAN communication, an infrared communication, a short-distance wireless communication and the like.

The relay 30 may relay the communication between the process monitorer 10 and the industrial device 50. The relay 30 may include, for example, a PLC (Programmable Logic Controller), an FA (Factory Automation) computer, a DCS controller (Distributed Control System), or a server. In the following description, the case where the relay 30 is the PLC will be described.

The relay 30 may relay the communication between the process monitorer 10 and the industrial device 50 in order to reduce the influence on the operation of the industrial device 50. For example, if the industrial device 50 directly transmits process information to the process monitorer 10, a transmission load for transmitting the process information may be generated in the industrial device 50, so that it may influence an information processing capability or a power condition etc. of the industrial device 50. The relay 30 may include a function as a buffer and may relay the communication so as not to influence an information processing ability etc. of the industrial device 50 by including an input/output unit according to an input/output of the industrial device 50. For example, when the relay 30 may be implemented by the PLC, it may be possible to select and incorporate various modules such as an input/output module, a communication module, and an optical communication module, etc. in the relay 30. For example, a non-voltage contact input, an AC voltage input, a DC voltage input, a triac contact output, a contact output, and a transistor output, or the like may be used as the input/output module. Various communication standards as described above may be selected and incorporated in the communication module and the optical communication module. It may be possible to select and incorporate the module with the input/output standards conforming to the input/output of the industrial device 50 in the relay 30 by using the PLC for the relay 30, so that the relay 30 may operate so as not to give the influence for the information processing capability etc. of the industrial device 50. Further, the relay 30 may block noise by electrically isolating the industrial device 50 from the process monitorer 10.

The operator 40 may output operation data to the process monitorer 10 via the relay 30. The operator 40 may include, for example, a touch panel, a push button switch, a select switch, and the like. The operator 40, for example, may be operated by the operator operating in the process of the industrial device 50. The operation of the operator 40 may be performed, for example, at the timing of the starting of the operation in the process, at the timing of finishing the operation, and at the timing of a predetermined operation to the industrial device 50, or the like. The operator 40 may acquire data that cannot be acquired from the industrial device 50 by the operation of the operator.

The industrial device 50 is a device that may be installed for each process and may output process information. The process is an arbitrary unit that manages a manufacturing, a production, an operation, etc. in various industrial fields such as a manufacturing industry, a mining, an agriculture, logistics, medical care, and nursing care and the like. For example, it may be set a one process in the plant, a one cell in an assembly line of a cell system, a one break of a treatment and an operation and the like as the one process. The process in the present embodiment is a range of an equipment and an operation to be monitored in real time for discovering symptoms of the defects. The industrial device 50 may be a device that may be used in the processes in various industrial fields. The industrial device 50 may be a unit device such as a motor, a pump. The industrial device 50 may be a composite device combining plural devices or plural functions. The process information outputted by the industrial device 50 may be information indicating the state of the process. The process information may be, for example, temperature, humidity, pressure, flow amount, flow rate, water quality, vibration, voltage, current, electric power, electric energy, production quantity, and process time, etc. The process information may include measurement data measured by a sensor, information stored in advance in a storage device or the like, and a calculated result calculated in the industrial device 50 in the industrial device 50, and the like.

In the process monitoring system 1 shown in FIG. 1, although it is exemplified the system in which the process monitorer 10, the relay 30, the operator 40, and the industrial device 50 are each constructed by the unit device, the configuration of the process monitoring system is not limited to the embodiment. For example, it may be the system in which any one or plural devices of the process monitorer 10, the relay 30, the operator 40 or the industrial device 50 are each composed of the plural devices. For example, the one process monitorer 10 may acquire the process information from the plural operators 40 or the plural industrial devices 50 via the one relay 30. It is assumed that the each process information may specify the process when the process monitorer 10 acquires the process information from the plural processes.

Figure 2:
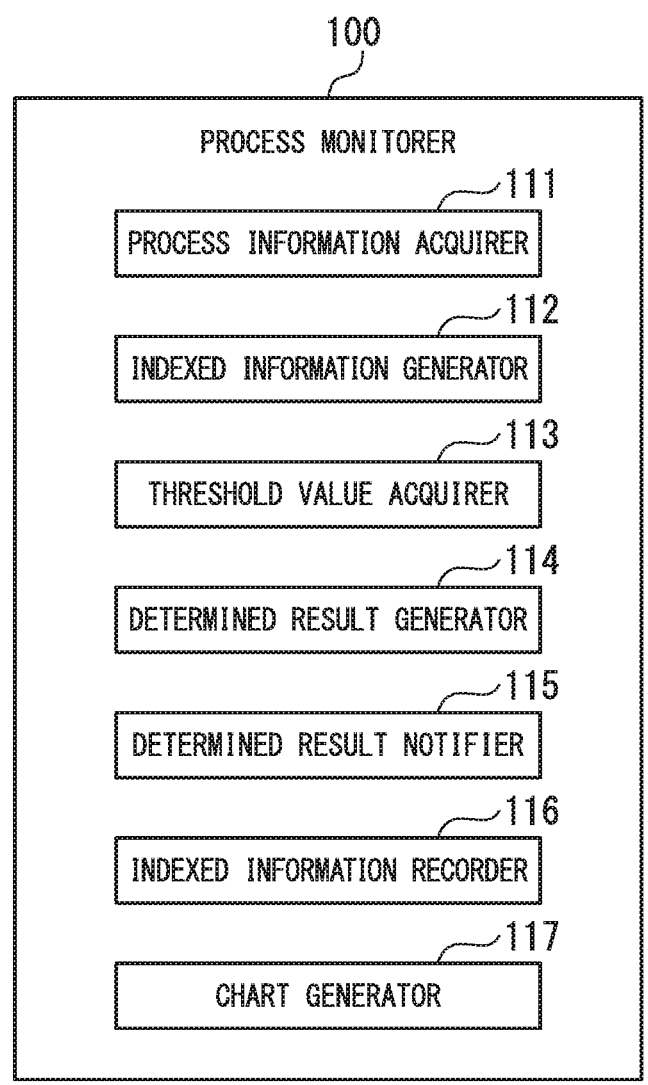
FIG. 2 is a block diagram showing an example of a functional configuration of a process monitorer according to the embodiment of the present invention.

Next, a functional configuration of the process monitorer 10 shown in FIG. 1 will be described with reference to FIG. 2. FIG. 2 is a block diagram showing an example of the functional configuration of the process monitorer according to the embodiment of the present invention.

The process monitorer 100 may include each function such as a process information acquirer 111, an indexed information generator 112, a threshold acquirer 113, a determination result generator 114, a determination result notifier 115, an indexed information recorder 116, and a chart generator 117. The respective functions of the process monitorer 100 may be realized by executing a program by the CPU 11 shown in FIG. 1. That is, each function of the process monitorer 100 may be a functional module realized by software.

The process information acquirer 111 may acquire the process information indicating a state of a process which is output from the industrial device 50 via the relay 30. The process information acquirer 111 may acquire information indicating the start and the finish of the process from, for example, information indicating the state of the industrial device 50. In addition, the information indicating the start and the finish of the process may be acquired from operation information for the operator 40. The process information acquirer 111, for example, may acquire the process information at predetermined time intervals. The process information acquirer 111 may output the acquired process information to the indexed information generator 112.

The indexed information generator 112 may generate indexed information indexed by a predetermined index based on the process information acquired by the process information acquirer 111. The index may be referred to as a processing method or logic of the process information. The indexed information may include a result of a process processed by a predetermined processing method. A type of the index may include, for example, industrial fields that may include a process type manufacturing industry or a discrete type manufacturing industry, a type of products, a classification of products, a value or numerical values that may be included in the process information, a process of generating a change of a cluster clustered the type of the index by maximum value, minimum value, average value, standard deviation, change rate, correlation coefficient, and regression analysis. The indexed information generator 112 may provide a UI (User Interface) and may index the selected type of the index so that the user may select a target for an indexed processing and the type of the index among the selected information such as the acquired industrial fields, a type of a product, a classification of a product, the process information. For example, when the process information acquirer 111 acquires the "temperature" measured by the temperature measurer as the process information for 5 minutes at intervals of 10 seconds, the indexed information generator 112 may generate the "the maximum value of the temperature in 5 minutes", and "the average value of the temperature in 5 minutes" and the like which are selected as the indexed information. Further, when the process information is "voltage" and "current", the indexed information generator 112 may generate "electric power" selected as the indexed information. The indexed information generator 112 may generate the indexed information by indexing the process information in real time.

The indexed information generator 112 may output the generated indexed information to the indexed information recorder 116. The indexed information may be generated in shorter time or more real time because the generating process of the indexed information generated by the indexed information generator 112 is narrowed down by selecting and narrowing down the target to be indexed and the types of the index.

The threshold acquirer 113 may acquire a threshold value of the indexed information. The threshold of the indexed information is the value for determining the indexed information depending on whether the indexed information is within the range of the threshold value. One or more threshold values may be set. When there is one threshold value, the threshold acquirer 113, for example, may generate a binary result of the determination which are normal or abnormal. In addition, when there are two threshold values, the threshold acquirer 113 may generate trivalent result of the determination, for example, normal, caution, and abnormal. Further, the threshold value may be a combination of the plural indexed information. Furthermore, the threshold value is not a constant but may be a function in which input value is the indexed information. Moreover, the threshold value may be the value indicating a region divided by plural parameters. The threshold value may be the threshold value respectively associated with or related to the industrial field, the type of the products, the classification of the products, the process information or other information which are to be indexed by the indexed information generator 112. The process for determining the indexed information is narrowed down by the threshold value respectively associating and relating with these pieces of information, and the result of the determination may be generated in a shorter time or more in real time. Further, the threshold value of the indexed information may be preset by the user and stored in such as a HDD 14. The threshold acquirer 113 may read out the threshold value of the indexed information stored in the HDD 14 or the like and output it to the determination result generator 114.

The determination result generator 114 may generate the result of the determination of the indexed information generated by the indexed information generator 112 based on the threshold value of the indexed information acquired by the threshold acquirer 113. The determination may be performed, for example, based on whether the value of the indexed information exceeds the threshold value. The determination result generator 114 may generate the result of the determination indicating the abnormal if the value of indexed information exceeds the threshold value, may generate the result of the determination indicating the normal if the value of the indexed information does not exceed the threshold value. When there is one threshold value, the determination result generator 114 may, for example, generate the binary result of the determination indicating the normal or the abnormal. When there are two threshold values, the determination result generator 114 may generate the result of the determination of the trivalent result of the determination, for example, the normal, the caution, and the abnormality. When the indexed information is generated in real time in the indexed information generator 112, the determination result generator 114 may generate the determined result in real time. The determination result generator 114 may output the generated result of the determination to the determination result notifier 115. It should be noted that the determination result generator 114 may output the result of the determination only when the result of the determination is abnormal.

The determination result notifier 115 may inform the result of the determination generated in the determination result generator 114. The decision result notifier 115 may inform the result of the determination to such as the industrial device 50 via the display 16, the relay 30. The determination result notifier 115 may notify the result of the determination only when the result of the determination is the abnormal. The industrial device 50 notified of the result of the determination from the determination result notifier 115 may notify the user the result of the determination, for example, through a display, a lamp, a buzzer or the like of the industrial device 50.

The indexed information recorder 116 may record the indexed information generated in the indexed information generator 112 in the HDD 14 or the like for each process. For example, when the indexed information of the process including the processes A to D is to be recorded, the indexed information recorder 116 may record the indexed information for each of the processes A to D.

The indexed information recorder 116 may record the indexed information, for example, as tabular data. The tabular data may be, for example, a data format including items and records, and, for example, may be the data in the CSV (Comma-Separated Values) format. In data of the CSV format, the items are separated with commas and one record is delimit by line feed. It may be used the data format for the spreadsheet application as the tabular data. When the indexed information is added and recorded, the indexed information recorder 116 may record the indexed information as an addition to a table format record. For example, the indexed information recorder 116 may record the indexed information of the process A as the data of the one record, and then may record the indexed information of the process B, the process C, and further the process D by adding one record with sequentially at a time. It is possible to simplify the data structure of the recorded indexed information and to facilitate using and editing such as reading, changing, deleting etc. of the recorded indexed information by adding and recording the indexed information by the record.

The indexed information recorder 116 may segment and record the indexed information based on the result of the determination generated by the determination result generator 114. For example, the indexed information recorder 116 may record the result of the determination as the item of the record to be recorded.

The chart generator 117 may generate a chart based on the indexed information recorded for each process in the indexed information recorder 116. The chart may be a figure or a table. The figure may include graphs, correlation diagrams, distribution diagrams and the like. The chart generated by the chart generator 117 may be preliminarily designated by the user. For example, the user may designate the range of the indexed information to be charted, the type of the graph, the display method and the like among the recorded indexed information. The range of the indexed information, for example, may be designated, for example, the type of the indexed information, the range of the date and time when the process information was acquired, the range of the date and time when the indexed information was generated, the result of the determination the number of the data and the threshold value. The charts may be displayed on a layout which are respectively linked or associated with such as the industrial field, the type of the product, the classification of the product, the process information and other information of which the information is indexed target by the indexed information generator 112. Further, the charts may be displayed on the layout which are respectively linked or associated with the thresholds respectively set by the threshold acquirer 113 for such as the industrial field, the type of the product, the classification of the product, the process information and the other information of which the information is indexed target by the indexed information generator 112. Furthermore, the information to be indexed by indexed information generator 112, such as the industrial field, the type of the product, the classification of the product, the process information and other information, the threshold value respectively set by threshold acquirer 113 with respect to the information such as the industrial field, the type of the product, the classification of the product, the process information and other information to be indexed by the indexed information generator 112, and the layout of the chart generated by the chart generator 117 based on the indexed information recorded for each process in the indexed information recorder 116, are linked or associated with each other. The type of the graphs may be designated such as a bar graph, a line graph, and a pie chart or the like. The display method may be designated, for example, the timing of displaying the chart and the device to be displayed.

The table generator 117 may generate the chart in real time and for each time the record of the indexed information is added. It may be possible to quickly correspond to the occurrence of the abnormality or the like in the process by generating the chart in real time and for each time the record of the indexed information is added.

In addition, the chart generator 117 may generate the chart based on the indexed information recorded in a segmented manner based on the result of the determination. For example, the chart generator 117 may generate the chart based on the result of the determination by coloring the indexed information, or changing the shape of the legend based on the result of the determination.

In FIG. 2, the functions of the process acquirer 111, the indexed information generator 112, the threshold acquirer 113, the determination result generator 114, the determination result notifier 115, the indexed information recorder 116, and the chart generator 117 in which the process monitorer 100 includes are realized by software was described. However, the above-mentioned one or more functions of the process monitorer 100 may be realized by hardware such as an ASIC or a gate array. In addition, each function of the process monitorer 100 may be implemented by dividing one function into plural functions. Further, each of the functions of the process monitorer 10 may be implemented by aggregating two or more functions into one function.

Figure 3:
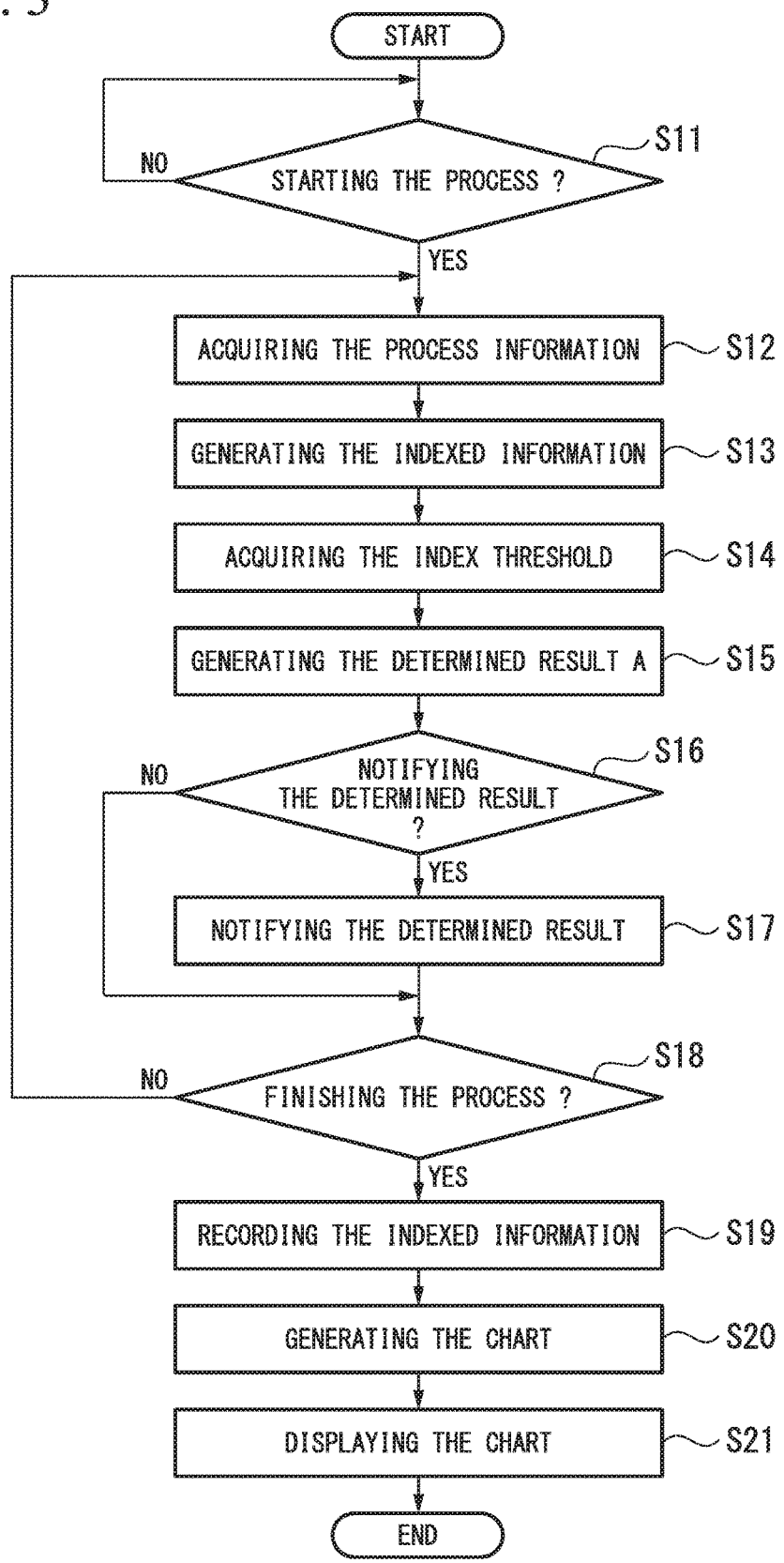
FIG. 3 is a flowchart showing an example of an operation of the process monitorer according to the embodiment of the present invention.

Next, the operation of the process monitorer 100 will be described with reference to FIG. 3. FIG. 3 is a flowchart showing an example of the operation of the process monitorer in the present embodiment. The operation shown in the flowchart of FIG. 3 is exemplified by the software executed by the CPU 11.

In FIG. 3, firstly, the CPU 11 may determine whether the process is started (step S11). The CPU 11 may determine whether process has been started, for example, by acquiring information indicating the state of the industrial device 50 or the operation information for the operator 40 or the like. If the CPU 11 determines that the process has not been started (step S11: NO), the CPU 11 may repeat the process of step S11 and may wait for the process to be started.

On the other hand, if the CPU 11 determines that the process has started (step S11: YES), the CPU 11 may acquire the process information from the industrial device 50 via the relay 30 (step S12). The acquisition of the process information may be, for example, performed by reading the value of a specific output module of the relay 30. It should be noted that, in the processing of step S12, a set of process information may be acquired, or the plural process information may be acquired. In step S12, the necessary process information is acquired in the process of the next step S13.

The CPU 11 may generate the indexed information indexed by a predetermined index based on the acquired process information (step S13). It is assumed that the index of the indexed information may be selected and set in advance by the user.

The CPU 11 may acquire the threshold value of the indexed information preset by the user (step S14). The threshold value may be a constant or a function as described above.

The CPU 11 may generate the result of the determination of the indexed information generated in step S13 based on the threshold value acquired in step S14, (step S15). The result of the determination may be binary of the normal or the abnormal, for example, when the threshold value is a constant. When the threshold value is two constant numbers, three values of the normal, the caution, or the abnormal may be generated. Also, if the threshold value clusters the indexed information, the result of the determination may be the cluster into which the indexed information is classified.

The CPU 11 may determine whether to notify the result of the determination generated in step S15 (step S16). In addition to the threshold value to be set, the threshold value used for determining whether to notify the result of the determination may be set in advance by the user. For example, the user may set to notify when the indexed information exceeds the threshold value. If it is determined to notify the generated result of the determination (step S16: YES), the CPU 11 may notify the result of the determination (step S17). The CPU 11 may notify the result of the determination to, for example, at least one of the display 16, the operator 40, or the industrial device 50. The result of the determination may be notified, for example, by character display, lighting by lamp, output by sound, a control signal transmitted to the industrial device 50, etc. If it is determined that the generated result of the determination is not notified (step S16: NO), the process of step S17 is skipped and the process of step S18 may be executed.

If it is determined that the generated result of the determination is not notified (step S16: NO), or after the process of step S17 is executed, the CPU 11 may determine whether the process has ended (step S18). Whether the process has ended may be determined by acquiring the information indicating the state of the industrial device 50 or the operation information for the operator 40, similarly to the processing in step S11. If it is determined that the process has not ended (step S18: NO), the CPU 11 may return to the process of step S12 and acquire the process information. It may execute the generation of the indexed information and the generation of the value of the determination plural times in one process by determining the end of the process in the process of step S18.

On the other hand, if it is determined that the process has ended (step S18: YES), the CPU 11 may record the indexed information for each process (step S19). Details of the recording of the indexed information for each process in step S19 will be described later with reference to FIG. 6.

After the process of step S19 is executed, the CPU 11 may generate the chart based on the indexed information recorded for each process (step S20). The user may designate the type of the chart to be generated in advance.

After executing the process of step S20, the CPU 11 may display the generated chart. The chart may be displayed, for example, in the display 16, in the operator 40, or in the industrial device 50.

As described with reference to FIG. 3, the CPU 11 may execute a step of acquiring the process information outputted for each process, a step of generating the indexed information indexed with a predetermined index based on the acquired process information, a step of acquiring a threshold value of the indexed information, a step of generating the result of the determination of the indexed information generated based on the acquired threshold value, a step of notifying the generated result of the determination, a step of recording the generated indexed information for each process, and a step of generating the chart based on the indexed information recorded for each process. The CPU 11 may be possible to monitor the process in real time by executing the above described steps.

Next, a setting of the index and a setting of the chart generated in the process monitorer 100 will be described with reference to FIG. 4. FIG. 4 is a diagram showing the example of the setting of the index and the chart generated by the process monitorer according to the present embodiment.

In FIG. 4, an index setting table 1000 may include each setting item of an index 1001, an index type 1002, a threshold-value type 1003, and a selection chart 1004. The index setting table 1000 may be displayed on the display 16 so that it may be set, for example, from the input unit 15 by the user. The index setting table 1000 shown in FIG. 4 may be commonly used in the process such as the process A, the process B, and the process C, etc. of the industrial device 50 described later in FIG. 5.

The index 1001 is an ID for specifying the index. In FIG. 4, though the indices 1 to 7 are exemplified, the numbers of indices are not limited to the above-noted numbers and are arbitrary. The indices 1 to 7 may indicate the same index in FIG. 5 and the like.

The index type 1002 is the setting item indicating the index type for generating the indexed information based on the process information. The indexing of the process information acquired from the industrial device 50 may be performed based on the setting of the index type 1002. The index type is, for example, an electric energy, a temperature A, a temperature B (the temperature A and the temperature B are mutually different process information), a product amount, a process time, a correlation between the temperature A and the temperature B, a clustering, and the like. The index type 1002 may allow the user to select the index type, for example, by selecting the setting item in the pull-down menu and selecting the setting item by pressing a radio button or a check box displayed on the display 16. The index type may specify the method (processing method) for indexing the acquired process information. The user may, for example, input a formula representing the process for the process information for setting the index type. The user may set an acquisition frequency, an acquisition condition, etc. of the process information used for the indexing for setting the index type.

The threshold type 1003 may be the setting item for setting the threshold type for the index type 1002. The threshold type 1003 may allow the user to select the threshold type, for example, by a pull-down menu or the like.

The index 1 may indicate that the maximum value is set as the threshold value for the index of the power amount. The electric power may indicate, for example, a magnitude of a load of the process. It may be possible to determine the overload in the process in real time by setting the maximum value of the electric power to the threshold value. In the threshold type such as the maximum value and the minimum value, an instant maximum value and the maximum value in the average value within a predetermined period and the like may be set.

The index 4 may show that the change rate is set as the threshold value for the index which is called the product amount. The change rate is a change rate in a predetermined period. The period during which the change rate is calculated may be set by the user. It may be possible to determine the occurrence of defects in real time in the process by setting the change rate as the threshold value for the index which is called the product amount. It may be set the change amount instead of the change rate.

The index 5 may indicate that the standard deviation is set as the threshold value for the index called the process time. For example, when performing the same task in the process, the process time may vary depending on such as the skill of the operator. It may determine the defects of the process in real time when the standard deviation by the operator exceeds the threshold value by setting the standard deviation as the threshold value for the index called the process time.

The index 6 may indicate that a correlation coefficient is set as the threshold value for the indices of a temperature A and a temperature B. For example, if the index of the temperature A of the inlet temperature and the temperature B of the outlet temperature of the product in the machining process are the process information with a strong correlation, it may determine the abnormal of the machining process in real time by setting the correlation coefficient as the threshold value for the index called the correlation coefficient of the temperature A and the temperature B.

The index 7 may indicate that a cluster fluctuation is set as the threshold value for the index which is a clustering. For example, it may be possible to determine the abnormality of the operation state in real time when the operation state of the device is clustered by including the plural process information by the process and when the cluster of the process may change to a different cluster by changing the state of the process. The reason for exemplifying the clustering as the index type is that a method of a regression analysis may be applied in the indexing. In this embodiment, an analysis method other than the regression analysis method such as clustering or the like may be applied.

The selection chart 1004 may be the setting item of the chart which is generated based on the indexed information recorded for each process. For example, a line graph is selected for the sets of the index 1 to 3, a bar graph is selected for the index 4, a table is selected for the sets of the index 5 to 7, and a distribution chart is selected for the index 6. FIG. 4 shows the case where the only one type of the chart is selected, for example, the plural types of the charts may be selectable, and the display may be switched by a user's operation.

The threshold value of the indexed information of the threshold type 1003 of the index setting table 1000 described in FIG. 4 will be described with reference to FIG. 5. FIG. 5 is a diagram showing the example of the threshold value of the indexed information to be determined by the process monitorer according to the present embodiment.

In FIG. 5, the threshold value setting table 1010 may include setting items such as a process 1011, an index 1 (1012), an index 2 (1013), an index 3 (1014), an index 4 (1015), and an index 5 (1016). The indices 1 to 7 are described in FIG. 4, the indices 1 to 5 are used in the processes A to D.

The process 1011 may set a process ID specifying the process of an industrial device 50. FIG. 5 exemplifies 4 processes of the process A to D, the number of the steps is not limited thereto. The indices 1 (1012) to 5 (1016) respectively correspond to the indices 1 to 5 of the index 1001 described in FIG. 4. That is, the index 1 (1012) is the setting item that may set the electric power as the index and the maximum value (W) as the threshold value. The index 2 (1013) is the setting item that may set the temperature A is set as the index and the maximum value (degree) is set as the threshold value. The index 3 (1014) is the setting item that may set the temperature B is set as the index and the minimum value (degree) is set as the threshold value. The index 4 (1015) is the setting item that the product amount is set as the index and the change rate (%) is set as the threshold value. Further, the index 5 (1016) is the setting item that a process time is set as the index and the threshold value is set as the threshold value (minute). For example, it may be represented in the process A that the threshold value of the maximum value is set to 10 W for the index called the electric power, the threshold value of the maximum value is set to 50 degree for the index called the temperature A, the threshold value of the minimum value is set to 40 degree for the index called the temperature B, the threshold value of the change rate is set to 5% for the index called the product amount, and further the threshold value of the standard deviation is set to 2 minutes for the index called the process time. The result of the determination described in the processing of step S15 in FIG. 3 is determined and generated by being based on whether the indexed information in the indices 1 to 5 respectively exceed the above-noted threshold values.

It may be possible to set the different threshold values for each process for the same index type by setting the threshold values for each index for each process by using the threshold value setting table 1010. FIG. 5 shows the case where the same index type is used for each process A to D. The threshold value may be set by using the different index types for each process.

Figure 6:
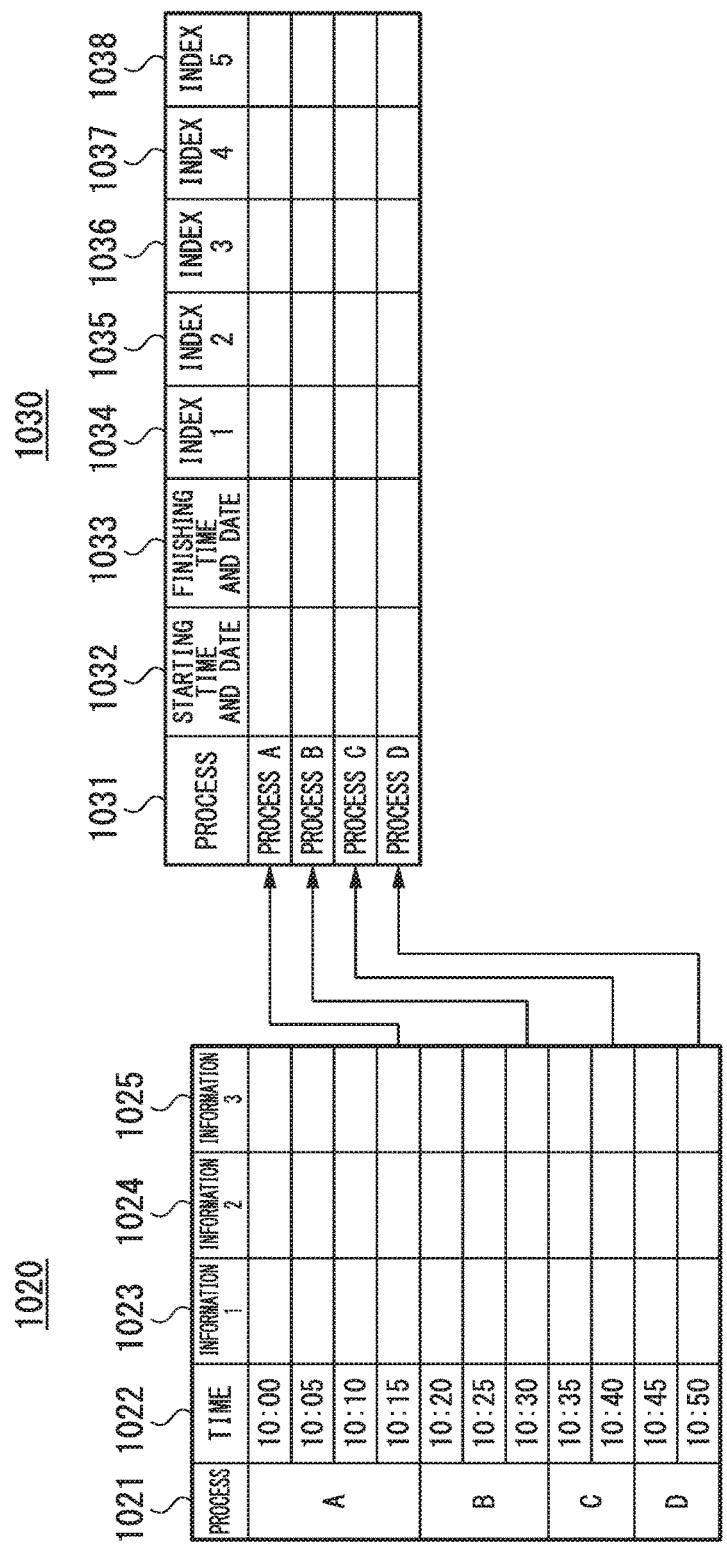
FIG. 6 is a diagram showing an example of index recorded by the process monitorer according to the embodiment of the present invention.

Next, the recording of the indexed information for each process described in the process of step S19 in FIG. 3 will be described with reference to FIG. 6. FIG. 6 is a diagram showing an example of the indexed information recorded by the process monitorer in the present embodiment. FIG. 6 shows that the process information recorded in a process information record 1020 is indexed and recorded in an indexed information record 1030.

In FIG. 6, the process information record 1020 may include the record items of a process 1021, a time 1022, information 1 (1023), information 2 (1024), and information 3 (1025). The record of one line of the process information record 1020 may correspond to the one record in the database.

The process 1021 may be the process ID that may specify the process of the industrial device 50 and exemplify the process A similarly to the process 1011 in FIG. 5.

The time 1022 may indicate an acquisition time of the process information in each process ID. For example, in FIG. 6, the case where the process ID may be the processes A to D and the process information acquired at intervals of 5 minutes is exemplified. In the process A, the process information is acquired 4 times or 4 records at 10:00, 10:05, 10:10, and 10:15. Similarly, the process information is acquired 3 times or 3 records in the process B, 2 times or 2 records in the process C, and 2 times or 2 records in the process D.

The acquired process information 1 is recorded in the information 1 (1023). The acquired process information 2 is recorded in the information 2 (1024). The acquired process information 3 is recorded in the information 3 (1025). Each process information acquired at the acquisition time of the process information set at the time 1022 is recorded in the recorded items of the information 1 (1023), the information 2 (1024), and the information 3 (1025). In FIG. 6, the case where the acquisition time of the process information 1, the process information 2, and the process information 3 are the same is exemplified, the acquisition time of the process information is arbitrary. For example, the acquisition interval may be set to be different depending on the process information.

As an example, the indexed information record 1030 may include the recorded items of a process 1031, a starting date and time 1032, an ending date and time 1033, an index 1 (1034), an index 2 (1035), an index 3 (1036), an index 4 (1037), and an index 5 (1038). The record items of one record may be recorded for each process in the indexed information record 1030.

The process 1031 is the same as the process 1021. In the record in the process A of the process 1031, the process information in the process A of the process 1021 may be indexed and the indexed information may be recorded in the indexed information record 1030 after the fourth process information is acquired in the process A of the process 1021. Similarly, in the record in the process B of the process 1031, the process information in the process B of the process 1021 is indexed, and the indexed information indexed may be recorded in the information record 1030 after the third process information is acquired in the process B of the process 1021. In the record in the process C of the process 1031, the process information in the process C of the process 1021 may be indexed and the indexed information may be recorded in the indexed information record 1030 after the second process information is acquired in the process C of the process 1021. In the record in the process D of the process 1031, the process information in the process D of the process 1021 may be indexed and the indexed information may be recorded in the indexed information record 1030 after the second process information is acquired in the process D of the process 1021. That is, the one record of the indexed information record 1030 may be recorded in real time (after being indexed) when the one process ends.

The starting date and time 1032 of the indexed information record 1030 may be the recording item of the starting date and time of each process of the process 1031. The ending date and time 1033 of the indexed information record 1030 may be the record item of the ending date and time of each process of the process 1031. The starting date and time 1032 or the ending date and time 1033 does not coincide with the time 1022 which is the time when the process information was acquired.

The index 1 (1034), the index 2 (1035), the index 3 (1036), the index 4 (1037), and the index 5 (1038) of the indexed information record 1030 are the record items of the indexed information generated based on the process information. FIG. 6 exemplifies that the five indexed information are generated and recorded.

For example, when the indexed information is generated based on the index setting table 1000 shown in FIG. 4, the maximum value of the amount of the electric energy acquired over the four records of the information 1 (1023) may be recorded in the process A (1021) of the process information record 1020 in the portion corresponding to the process A (1021) of the index 1 (1034) of the indexed information record 1030. The maximum value of the amount of the electric energy acquired over the three records of the information 1 (1023) in the process B (1021) may be recorded in the portion corresponding to the process B (1021) of the index 1 (1034) of the indexed information record 1030. Similarly, the maximum value of the temperature A acquired over the four records of the information 2 (1024) in process A may be recorded in the portion corresponding to the process A of the index 2 (1035). The maximum value of the temperature A acquired over the three records of the information 2 (1024) in the process B may be recorded in the portion corresponding to the process B of the index 2 (1035).

The process information record 1020 or the indexed information record 1030 may be recorded in the HDD 14 or the like. The process information record 1020 or the indexed information record 1030 may be recorded as CSV format data or tabular data.

In addition, FIG. 6 described the case where the process information record 1020 and the indexed information record 1030 were recorded as the separate tables (data). The process information record 1020 and the indexed information record 1030 may be recorded as the same table. For example, it may be possible to record both records as one table by assigning a code to distinguish the respective records from the record of the process information and the record of the indexed information.

As explained above, in the present embodiments of the invention, the process monitorer includes: the process information acquirer for acquiring the process information indicating the state of the process output from the industrial device; the indexed information generator for generating the indexed information indexed by the predetermined index based on the acquired process information; the threshold acquirer for acquiring the threshold value of the indexed information; the result of the determination generator for generating the result of the determination of the generated indexed information based on the acquired threshold value; the result of the determination notifier for notifying the generated result of the determination; the indexed information generator for recording the generated indexed information; and the chart generator for generating the chart based on the recorded indexed information. The process monitorer may be possible to monitor the process in real time.

It is also possible to record a program for realizing the functions configuring each device described in the present embodiment on a computer readable recording medium and cause the computer system to read the program recorded on the recording medium. The above-described various processes of the present embodiment may be performed. Note that the "computer system" referred to here may include the hardware such as an OS and peripheral devices. In addition, the "computer system" may include a website providing environment or a display environment as long as it is using a WWW system. Further, the "computer-readable recording medium" may be a storage device including a writable nonvolatile memory such as a flexible disk, a magneto-optical disk, a ROM, a flash memory, a portable medium such as a CD-ROM, and a hard disk incorporated in the computer system.

Further, the "computer readable recording medium" may include a program for a certain period of time such as a volatile memory, for example, a DRAM (Dynamic Memory) in the computer system serving as the server or a client when the program is transmitted via the network such as the Internet or the communication line such as the telephone line. Furthermore, the above-noted program may be transmitted from the computer system in which the program may be incorporated in the storage device or the like to another computer system via a transmission medium or by a transmission wave in a transmission medium. The "transmission medium" for transmitting the program refers to a medium having a function of transmitting information such as the network or the communication network such as the Internet and the communication line or the communication wire such as the telephone line. The above-noted program may be implementing a part of the above-described functions. Further, the above-noted program may be implementing the above-described function in combination with the program already stored in the computer system, a so-called difference file or difference program.

The present embodiment of the present invention has been described with reference to the drawings, the specific configuration is not limited to the present embodiments, and various modifications are also included without departing from the gist of the present invention.

What is claimed is:

1. A process monitorer comprising:
at least one memory storing instructions, and
at least one processor configured to execute the instructions to:
acquire process information indicating a state of each of plural processes provided from an industrial device;
generate in real time indexed information indexed by a predetermined index based on the process information of each of the plural processes and an index setting table when each of the plural processes ends, the index setting table including setting items of at least an identifier for specifying an index, an index type, and a threshold-value type;
acquire a threshold value of the indexed information, the threshold value being set for each of the plural processes;
generate in real time a result of a determination of the indexed information based on the threshold value and the indexed information for each of the plural processes; and
notify the result of the determination.

2. The process monitorer according to claim 1,
wherein acquiring the process information comprises acquiring the process information via a relay for relaying the process information.

3. The process monitorer according to claim 2,
wherein acquiring the process information comprises acquiring the process information received from an operator installed on the process via the relay.

4. The process monitorer according to claim 1,
wherein the at least one processor is configured to execute the instructions to:
record in real time the indexed information when each of the plural processes ends; and
generate a chart based on the indexed information,
wherein:
recording the indexed information comprises recording the indexed information as adding a table-type record, and
generating the chart comprises generating the chart in real time in each adding the record.

5. The process monitorer according to claim 2,
wherein the at least one processor is configured to execute the instructions to:
record in real time the indexed information when each of the plural processes ends; and
generate a chart based on the indexed information,
wherein:
recording the indexed information comprises recording the indexed information as adding a table-type record, and
generating the chart comprises generating the chart in real time in each adding the record.

6. The process monitorer according to claim 3,
wherein the at least one processor is configured to execute the instructions to:
record in real time the indexed information when each of the plural processes ends; and
generate a chart based on the indexed information,
wherein:
recording the indexed information comprises recording the indexed information as adding a table-type record, and
generating the chart comprises generating the chart in real time in each adding the record.

7. The process monitorer according to claim 1,
wherein the at least one processor is configured to execute the instructions to:
segment and record in real time the indexed information based on the result of the determination when each of the plural processes ends, and
generate a chart based on the indexed information.

8. The process monitorer according to claim 2,
wherein the at least one processor is configured to execute the instructions to:
segment and record in real time the indexed information based on the result of the determination when each of the plural processes ends, and
generate a chart based on the indexed information.

9. The process monitorer according to claim 3,
wherein the at least one processor is configured to execute the instructions to:
segment and record in real time the indexed information based on the result of the determination when each of the plural processes ends, and
generate a chart based on the indexed information.

10. The process monitorer according to claim 4,
wherein recording the indexed information comprises segmenting and recording the indexed information based on the result of the determination.

11. The process monitorer according to claim 1,
wherein the at least one processor is configured to execute the instructions to:
generate a chart based on the pre-designated predetermined index.

12. The process monitorer according to claim 1,
wherein the threshold value acquired is associated with an indexed information target indexed.

13. The process monitorer according to claim 1,
wherein a chart generated is associated with an indexed information target indexed.

14. The process monitorer according to claim 1,
wherein an indexed information target indexed, the threshold value acquired, and a chart generated are associated with each other.

15. The process monitorer according to claim 1,
wherein acquiring the threshold value of the indexed information comprises acquiring the threshold value of the indexed information from a threshold value setting table, the threshold value setting table including setting items of a process identifier for specifying each of the plural processes and the identifier for specifying an index, and
generating in real time the result of the determination of the indexed information comprises generating in real time the result of the determination of the indexed information based on the threshold value for each identifier for specifying an index acquired from the threshold value setting table and the indexed information.

16. A process monitoring system comprising:
a relay configured to relay process information indicating a state of each of plural processes provided from an industrial device; and
a process monitorer comprising:
at least one memory storing instructions, and
at least one processor configured to execute the instructions to:
acquire the process information via the relay;
generate in real time indexed information indexed by a predetermined index based on the process information of each of the plural processes and an index setting table when each of the plural processes ends, the index setting table including setting items of at least an identifier for specifying an index, an index type, and a threshold-value type;
acquire a threshold value of the indexed information, the threshold value being set for each of the plural processes;
generate in real time a result of a determination of the indexed information based on the threshold value and the indexed information for each of the plural processes;
notify the result of the determination;
record in real time the indexed information when each of the plural processes ends; and
generate a chart based on the indexed information.

17. The process monitoring system according to claim 16,
wherein the threshold value acquired is associated with an indexed information target indexed.

18. The process monitoring system according to claim 16,
wherein the chart generated is associated with an indexed information target indexed.

19. The process monitoring system according to claim 16,
wherein an indexed information target indexed, the threshold value acquired, and the chart generated are associated with each other.

20. A process monitoring method comprising:
acquiring process information indicating a state of each of plural processes provided from an industrial device;
generating in real time indexed information indexed by a predetermined index based on the process information of each of the plural processes and an index setting table when each of the plural processes ends, the index setting table including setting items of at least an identifier for specifying an index, an index type, and a threshold-value type;

acquiring a threshold value of the indexed information, the threshold value being set for each of the plural processes;

generating in real time a result of a determination of the indexed information based on the threshold value and the indexed information for each of the plural processes;

notifying the result of the determination;

recording in real time the indexed information when each of the plural processes ends; and generating a chart based on the indexed information.

* * * * *